United States Patent
Chen et al.

(10) Patent No.: US 12,483,806 B2
(45) Date of Patent: Nov. 25, 2025

(54) IMAGE CAPTURING APPARATUS AND BRIGHTNESS BALANCING METHOD

(71) Applicant: HUAWEI TECHNOLOGIES CO., LTD., Guangdong (CN)

(72) Inventors: Xiaolei Chen, Hangzhou (CN); Qing Zhu, Shenzhen (CN); Changcai Lai, Shenzhen (CN); Hongqi Hu, Hangzhou (CN); Changjiu Yang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 205 days.

(21) Appl. No.: 18/225,289

(22) Filed: Jul. 24, 2023

(65) Prior Publication Data

US 2023/0370734 A1    Nov. 16, 2023

Related U.S. Application Data

(63) Continuation of application No. PCT/CN2022/072888, filed on Jan. 20, 2022.

(30) Foreign Application Priority Data

Jan. 25, 2021 (CN) .......... 202110100107.3

(51) Int. Cl.
*H04N 25/531* (2023.01)
*H04N 23/68* (2023.01)
(Continued)

(52) U.S. Cl.
CPC .......... *H04N 25/531* (2023.01); *H04N 23/71* (2023.01); *H04N 23/72* (2023.01); *H04N 23/73* (2023.01)

(58) Field of Classification Search
CPC ...... H04N 25/531; H04N 23/71; H04N 23/72; H04N 23/73; H04N 23/689; H04N 23/75
See application file for complete search history.

(56) References Cited

U.S. PATENT DOCUMENTS

2006/0157760 A1* 7/2006 Hayashi ................. H04N 25/62
257/292
2007/0177049 A1   8/2007 Kreysar et al.
(Continued)

FOREIGN PATENT DOCUMENTS

| CN | 102137234 A | 7/2011 |
|----|-------------|--------|
| CN | 105635538 A | 6/2016 |
| WO | 2020160819 A1 | 8/2020 |

*Primary Examiner* — Ahmed A Berhan
(74) *Attorney, Agent, or Firm* — WOMBLE BOND DICKINSON (US) LLP

(57) ABSTRACT

An embodiment of this application discloses an image capturing apparatus, including a rolling shutter image sensor, a wheel, and a driving apparatus. The wheel is located on a photosensitive side of the rolling shutter image sensor, and a light shielding part for blocking light and a light transmission part for transmitting light are disposed on the wheel. When the driving apparatus drives the wheel to rotate, the light transmission part on the wheel periodically transmits light, so that a plurality of rows of photosensitive units in the rolling shutter image sensor receive the transmitted light, and convert a light signal into an electric signal through optical-to-electrical conversion. In addition, the rolling shutter image sensor is combined with the wheel, to reduce costs of the image capturing apparatus.

13 Claims, 11 Drawing Sheets

(51) Int. Cl.
*H04N 23/71* (2023.01)
*H04N 23/72* (2023.01)
*H04N 23/73* (2023.01)
*H04N 23/75* (2023.01)

(56) References Cited

U.S. PATENT DOCUMENTS

2010/0013946 A1   1/2010  Amano
2011/0019071 A1*  1/2011  Amano ................ H04N 25/767
                                                                   348/E5.037
2012/0120291 A1*  5/2012  Shiohara ................ H04N 23/75
                                                                  348/296
2020/0019039 A1*  1/2020  Hong .................... G03B 33/00

* cited by examiner (a)          (b)

IMAGE CAPTURING APPARATUS AND BRIGHTNESS BALANCING METHOD

CROSS-REFERENCE TO RELATED APPLICATIONS

This application is a continuation of International Application No. PCT/CN2022/072888, filed on Jan. 20, 2022, which claims priority to Chinese Patent Application No. 202110100107.3, filed on Jan. 25, 2021. The disclosures of the aforementioned applications are hereby incorporated by reference in their entireties.

TECHNICAL FIELD

This application relates to the field of image processing technologies, and in particular, to an image capturing apparatus and a brightness balancing method.

BACKGROUND

In a traffic scenario, a vehicle traveling on a road usually needs to be snapped. Usually, a vehicle traveling on the road moves at a high speed, and therefore, a high requirement is imposed on an image capturing apparatus used for snapping. Currently, an image sensor in the image capturing apparatus usually includes a rolling shutter image sensor and a global shutter image sensor.

When the rolling shutter image sensor is used for snapping, if a vehicle moves at a high speed, an image snapped by the rolling shutter image sensor is obviously deformed, and shooting effect is poor. If the global shutter image sensor is used for snapping, image deformation can be avoided.

However, costs of the image capturing apparatus using the global shutter image sensor are high. For same performance, costs of a global shutter image capturing apparatus are often 5 to 10 times the costs of a rolling shutter image capturing apparatus. Therefore, to meet a requirement of intelligent transportation development, an image capturing apparatus with low costs and good shooting effect is urgently needed.

SUMMARY

This application provides an image capturing apparatus, to achieve good image shooting effect at low costs, and meet an image shooting requirement in a high-speed moving scenario.

According to a first aspect, this application provides an image capturing apparatus that may be applied to a traffic scenario. The image capturing apparatus includes a rolling shutter image sensor, a wheel, and a driving apparatus. The wheel is located on a photosensitive side of the rolling shutter image sensor, a light shielding part and a light transmission part are disposed on the wheel, the light shielding part is configured to block light, and the light transmission part is configured to transmit light. The driving apparatus is connected to the wheel, and is configured to drive the wheel to rotate. The rolling shutter image sensor includes a plurality of rows of photosensitive units, and the plurality of rows of photosensitive units are configured to: receive light transmitted by the light transmission part, and convert a light signal into an electrical signal through optical-to-electrical conversion. When the driving apparatus drives the wheel to rotate, the light shielding part on the wheel periodically blocks light, and the light transmission part on the wheel periodically transmits light. Therefore, the plurality of rows of photosensitive units can periodically receive light transmitted by the light transmission part.

In this embodiment, the wheel on which the light shielding part and the light transmission part are disposed periodically blocks light on the photosensitive unit, so that exposure times of all photosensitive units are the same. Therefore, shooting effect of the rolling shutter image sensor is the same as shooting effect of a global exposure sensor. In addition, the rolling shutter image sensor is combined with the wheel, to reduce costs of the image capturing apparatus.

In an embodiment, the light transmission part is a notch on the wheel. During exposure of the plurality of rows of photosensitive units, the plurality of rows of photosensitive units of the rolling shutter image sensor are exposed to the notch, and light can be transmitted to the photosensitive units through the notch. When the wheel rotates to a first position, the plurality of rows of photosensitive units are located in the notch, and the plurality of rows of photosensitive units can perform exposure. When the wheel rotates to a second position, the wheel blocks the plurality of rows of photosensitive units, and exposure of the plurality of rows of photosensitive units ends. When the wheel rotates to a third position, the wheel blocks some photosensitive units in the plurality of rows of photosensitive units, and other photosensitive units in the plurality of rows of photosensitive units are located in the notch.

In an embodiment, a band-pass optical filter is disposed on the light transmission part. The band-pass optical filter is configured to filter out stray light (for example, light other than visible light), to improve exposure effect of the photosensitive unit during exposure.

In an embodiment, the wheel is of a circular shape, and the light transmission part is of a fan shape.

In an embodiment, one side of the light transmission part includes a first edge in a direction from a circle center to an arc edge, the first edge is parallel to a target-row photosensitive unit when blocking the target-row photosensitive unit, and the target-row photosensitive unit is one-row photosensitive unit in the plurality of rows of photosensitive units. When the wheel is disposed to block the photosensitive unit, one edge of the notch is parallel to the target-row photosensitive unit, to save a time in which the wheel completely blocks the photosensitive units of the rolling shutter image sensor, and ensure that exposure times of the photosensitive units are as close as possible.

In an embodiment, the image capturing apparatus further includes a sensor and a controller, and the sensor is configured to detect a position relationship between the wheel and the plurality rows of photosensitive units. The controller is configured to: when the sensor detects that the plurality of rows of photosensitive units all receive light transmitted by the light transmission part, control the plurality of rows of photosensitive units to perform global reset.

In an embodiment, the plurality of rows of photosensitive units include a first-row photosensitive unit and a second-row photosensitive unit that are adjacent, and a difference between duration in which the first-row photosensitive unit receives light and duration in which the second-row photosensitive unit receives light is less than a signal read time of the first-row photosensitive unit. The rolling shutter image sensor performs global reset, so that exposure start moments of the plurality of rows of photosensitive units in the rolling shutter image sensor are the same. Therefore, a difference between exposure times of two adjacent rows of photosensitive units in the plurality of rows of photosensitive units is a time difference in which the two rows of photosensitive units are blocked by the wheel. A speed at which the wheel blocks the plurality of rows of photosensitive units is controlled, so that a difference between exposure times of two adjacent rows of photosensitive units in the plurality of rows of photosensitive units is less than a signal read time of each row photosensitive unit, to ensure that exposure times of the plurality of rows of photosensitive units are as close as possible.

According to a second aspect, this application provides a brightness balancing method. The method is applied to an image capturing apparatus, the image capturing apparatus includes a plurality of rows of photosensitive units, and the method includes: obtaining an exposure time of a first-row photosensitive unit in the plurality of rows of photosensitive units and an exposure time of a second-row photosensitive unit in the plurality of rows of photosensitive units. The first-row photosensitive unit is one-row photosensitive unit on which brightness balancing needs to be performed, and the first-row photosensitive unit may be, for example, any row photosensitive unit in the plurality of rows of photosensitive units other than the second-row photosensitive unit. The second-row photosensitive unit is one-row photosensitive unit used as a brightness reference, and brightness of a pixel corresponding to the second-row photosensitive unit does not need to be adjusted. A brightness balance coefficient of the first-row photosensitive unit is determined based on the exposure time of the first-row photosensitive unit and the exposure time of the second-row photosensitive unit. Brightness adjustment is performed, based on the brightness balance coefficient, on a pixel corresponding to the first-row photosensitive unit.

In this embodiment, brightness of each row photosensitive unit is adjusted by using a row-based brightness balancing method, to effectively compensate a local brightness difference in an image due to different exposure times of different rows. This can ensure image quality.

In an embodiment, the obtaining an exposure time of a first-row photosensitive unit and an exposure time of a second-row photosensitive unit includes: obtaining the exposure time of the first-row photosensitive unit based on an exposure time of a third-row photosensitive unit, a transition status time, a row in which the first-row photosensitive unit is located, and a quantity of rows of the plurality of rows of photosensitive units; and obtaining the exposure time of the second-row photosensitive unit based on the exposure time of the third-row photosensitive unit, the transition status time, a row in which the second-row photosensitive unit is located, and the quantity of rows of the plurality of rows of photosensitive units. The third-row photosensitive unit is one-row photosensitive unit with a shortest exposure time in the plurality of rows of photosensitive units, and the transition status time is a time required from ending of exposure of one-row photosensitive unit with a shortest exposure time in the plurality of rows of photosensitive units to ending of exposure of one-row photosensitive unit with a longest exposure time in the plurality of rows of photosensitive units.

In an embodiment, the wheel includes a wheel that rotates relative to the rolling shutter image sensor, a notch used by the plurality of rows of photosensitive units to sense light is disposed on the wheel, and the wheel is a circular wheel. The transition status time is determined based on a side length of the image sensor, a frame rate of the image sensor, and a radius of the circular wheel.

In an embodiment, the second-row photosensitive unit is the one-row photosensitive unit with the shortest exposure time in the plurality of rows of photosensitive units, or the second-row photosensitive unit is the one-row photosensitive unit with the longest exposure time in the plurality of rows of photosensitive units.

According to a third aspect, this application provides an image processing apparatus, including a processor. The processor is coupled to a memory. The memory stores program instructions, and when the program instructions stored in the memory are executed by the processor, the method in the second aspect is implemented. For operations performed by the processor in the possible implementations of the second aspect, refer to the second aspect. Details are not described herein again.

According to a fourth aspect, this application provides a computer-readable storage medium. The computer-readable storage medium stores a computer program, and when the computer program is run on a computer, the computer is enabled to perform the method in the second aspect.

According to a fifth aspect, this application provides a computer program product. The computer program product stores a computer program, and when the computer program is run on a computer, the computer is enabled to perform the method in the second aspect.

According to a sixth aspect, this application provides a circuit system. The circuit system includes a processing circuit, and the processing circuit is configured to perform the method in the second aspect.

According to a seventh aspect, this application provides a chip, including one or more processors. Some or all of the processors are configured to read and execute a computer program stored in a memory, to perform the method according to any possible implementation of any one of the foregoing aspects. In an embodiment, the chip includes the memory, and the memory and the processor are connected to the memory by using a circuit or a wire. In an embodiment, the chip system further includes a communication interface, and the processor is connected to the communication interface. The communication interface is configured to receive data and/or information that needs to be processed. The processor obtains the data and/or information from the communication interface, processes the data and/or information, and outputs a processing result through the communication interface. The communication interface may be an input/output interface. The method according to this application may be implemented by one chip, or may be cooperatively implemented by a plurality of chips.

DESCRIPTION OF EMBODIMENTS

Figure 1:
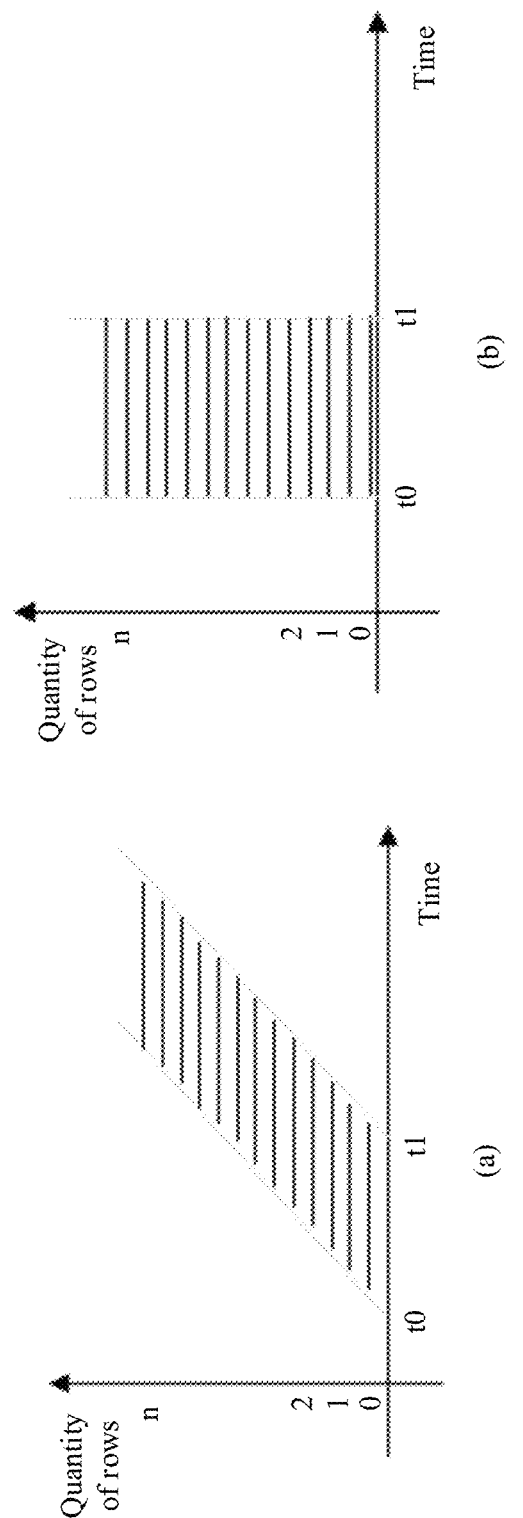
FIG. 1 is a schematic diagram of exposure of a rolling shutter image sensor and a global shutter image sensor.

The following describes embodiments of this application with reference to the accompanying drawings in embodiments of this application. Terms used in embodiments of this application are only used to explain specific embodiments of this application, but are not intended to limit this application.

The following describes embodiments of this application with reference to the accompanying drawings. A person of ordinary skill in the art may learn that as a technology evolves and a new scenario emerges, technical solutions provided in embodiments of this application are also applicable to a similar technical problem.

In the specification, claims, and the accompanying drawings of this application, terms "first", "second", and the like are intended to distinguish similar objects but do not necessarily indicate a specific order or sequence. It should be understood that the terms used in such a way are interchangeable in proper circumstances, which is merely a discrimination manner that is used when objects having a same attribute are described in embodiments of this application. In addition, terms "include", "contain" and any other variants mean to cover the non-exclusive inclusion, so that a process, method, system, product, or device that includes a series of units is not limited to those units, but may include other units not expressly listed or inherent to such a process, method, system, product, or device.

To facilitate understanding of an image capturing apparatus provided in embodiments of this application, an application scenario of the image capturing apparatus is first described. The image capturing apparatus provided in embodiments of this application may be applied to a scenario of snapping an object moving at a high speed, for example, configured to photograph a vehicle on a road in an intelligent transportation scenario. For example, in a checkpoint scenario, a speed of a vehicle to be snapped on a road is higher than 100 km/h. To snap a clear image, an image capturing apparatus in a related technology uses a global shutter image sensor with high costs. Consequently, costs are large during large-scale application, and development of intelligent transportation is limited. Therefore, this application provides an image capturing apparatus, to achieve same shooting effect, and reduce costs of the image capturing apparatus.

To facilitate understanding of an image capturing apparatus provided in embodiments of this application, the following first describes two types of image sensors related to embodiments of this application.

The global shutter image sensor uses a global shutter manner to control a shutter. After the shutter is enabled, all photosensitive units of the global shutter image sensor simultaneously start exposure. After the shutter is disabled, all the photosensitive units of the global shutter image sensor simultaneously end exposure. The global shutter image sensor has a built-in buffer that can store signals captured by the photosensitive units after exposure, to facilitate continuous reading of the signals. Therefore, the global shutter image sensor allows all the photosensitive units to simultaneously start and end exposure. The photosensitive unit is configured to convert an optical signal into an electrical signal during exposure, to record optical signal information. For example, the photosensitive unit of the image sensor may be, for example, a photoelectric sensor. Exposure of the photosensitive unit means that light is irradiated to the photosensitive unit, so that the photosensitive unit converts an optical signal into an electrical signal.

The rolling shutter image sensor uses a rolling shutter manner to control a shutter. After the shutter is enabled, photosensitive units of the rolling shutter image sensor start progressive exposure, and signals captured by each row photosensitive unit are continuously read after exposure of each row photosensitive unit ends. For the rolling shutter image sensor, start moments and end moments of exposure times of different rows of photosensitive units are different, but the exposure times are the same.

Specifically, FIG. 1 is a schematic diagram of exposure of a rolling shutter image sensor and a global shutter image sensor. As shown in FIG. 1(*a*), the rolling shutter image sensor uses a progressive exposure manner, an exposure time period of a first-row photosensitive unit is [t0, t1], and exposure start moments and exposure end moments of subsequent rows of photosensitive units are different. A time difference between exposure end moments of two adjacent rows of photosensitive units is just a time required for reading a signal of one-row photosensitive unit. In other words, when a signal captured by one-row photosensitive unit is read, exposure of a next-row photosensitive unit just ends, to continue to read a signal captured by the next-row photosensitive unit. Because an exposure start moment and an exposure end moment of each row photosensitive unit are different, when a photographed object moves at a high speed, an image is deformed. Because deformation of the image is similar to that of a jelly when the jelly is squeezed, a phenomenon that occurs when the rolling shutter image sensor photographs a moving object is referred to as "jelly" effect.

As shown in FIG. 1(*b*), the global shutter image sensor uses all the photosensitive units to simultaneously start and end exposure, and an exposure time period of each row photosensitive unit is [t0, t1]. Because exposure time periods of all the photosensitive units are the same, when the global shutter image sensor is used to photograph an object moving at a high speed, an image is not deformed.

Figure 2:
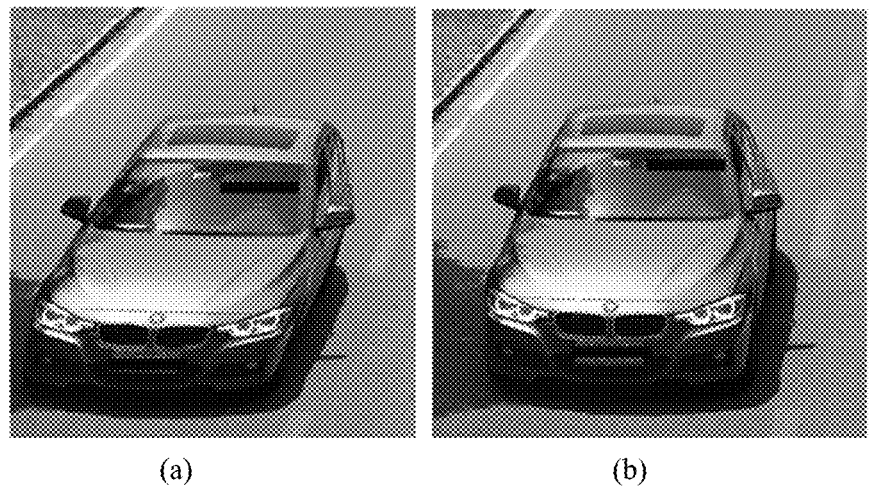
FIG. 2 is a schematic diagram of photographing comparison between a rolling shutter image sensor and a global shutter image sensor.

Specifically, FIG. 2 is a schematic diagram of photographing comparison between a rolling shutter image sensor and a global shutter image sensor. As shown in FIG. 2, FIG. 2(*a*) is an image photographed by using a rolling shutter image sensor, and the image is obviously deformed. FIG. 2(*b*) is an image photographed by using a global shutter image sensor, and the image is not deformed.

Figure 3:
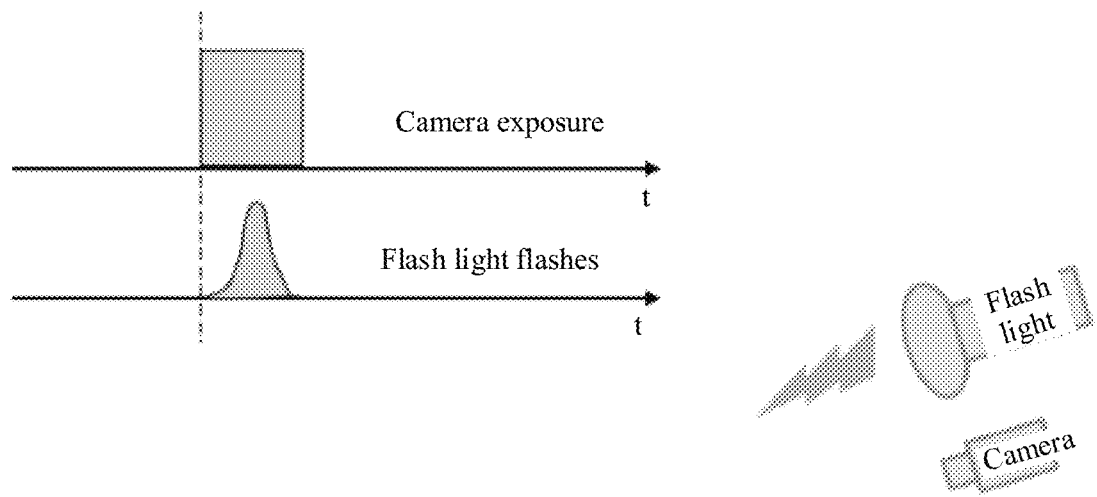
FIG. 3 is a schematic diagram of snapping in a related technology.
Figure 3:

In view of this, in the conventional technology, an image capturing apparatus used for traffic snapping usually uses a global shutter image sensor. During exposure of the global shutter image sensor, an illuminator is enabled for snapping. Specifically, FIG. 3 is a schematic diagram of snapping in a related technology.

However, costs of the image capturing apparatus using the global shutter image sensor are high. For same performance, costs of a global shutter image capturing apparatus are often 5 to 10 times costs of a rolling shutter image capturing apparatus.

In view of this, an embodiment of this application provides an image capturing apparatus. The image capturing apparatus is an image capturing apparatus designed based on a rolling shutter image sensor. The image capturing apparatus can achieve good image capturing effect at low costs, and meet an image capturing requirement in a high-speed moving scenario.

Figure 4:
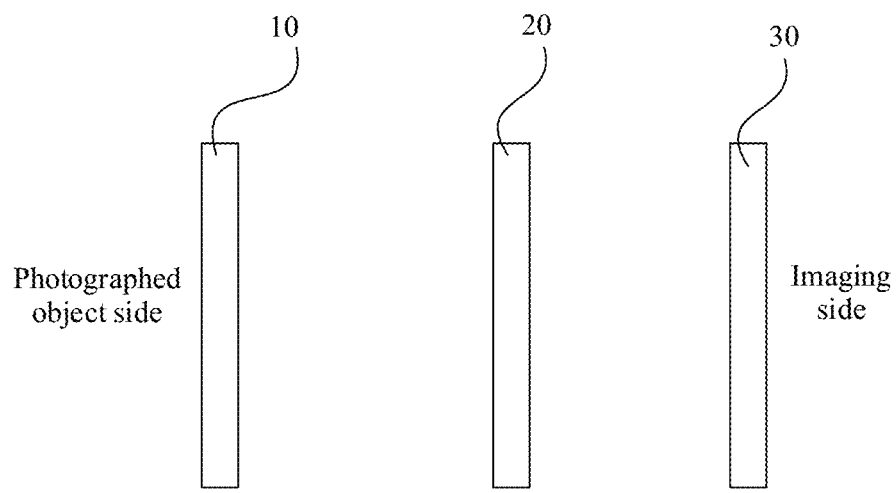
FIG. 4 is a schematic diagram of a structure of an image capturing apparatus according to an embodiment of this application.

FIG. 4 is a schematic diagram of a structure of an image capturing apparatus according to an embodiment of this application. As shown in FIG. 4, the image capturing apparatus includes a lens 10, a wheel 20, a rolling shutter image sensor 30, and a driving apparatus (not shown in the figure). The lens 10, the wheel 20, and the rolling shutter image sensor 30 are sequentially disposed in a direction from a photographed object side to an imaging side. The wheel 20 is located between the lens 10 and the rolling shutter image sensor 30, that is, the wheel 20 is located on a photosensitive side (a side of the rolling shutter image sensor 30 facing the lens 10) of the rolling shutter image sensor 30. The driving apparatus is connected to the wheel 20, and is configured to drive the wheel 20 to rotate. The wheel 20 is configured to block light irradiated to the rolling shutter image sensor 30 at a specific time. When the wheel 20 does not block light, light passing through the lens 10 may be irradiated to the rolling shutter image sensor 30 for imaging, to implement exposure of the rolling shutter image sensor 30. When the wheel 20 blocks light, light passing through the lens 10 is blocked by the wheel 20, and no light is irradiated to the rolling shutter image sensor 30.

Figure 5:
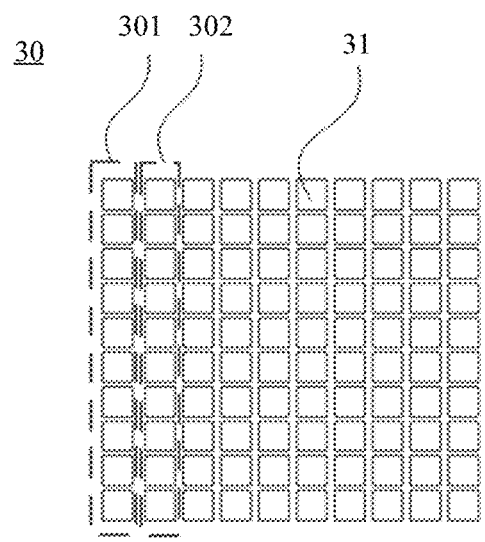
FIG. 5 is a schematic diagram of a structure of a rolling shutter image sensor 30 according to an embodiment of this application.

FIG. 5 is a schematic diagram of a structure of the rolling shutter image sensor 30 according to an embodiment of this application. As shown in FIG. 5, the rolling shutter image sensor 30 uses a rolling shutter manner for exposure. The rolling shutter image sensor 30 includes a plurality of rows of photosensitive units, each row photosensitive unit includes a plurality of photosensitive units 31, and the photosensitive units 31 of the entire rolling shutter image sensor 30 are arranged in an array.

In this embodiment of this application, the rolling shutter image sensor 30 has a global reset function. In other words, the plurality of rows of photosensitive units of the rolling shutter image sensor 30 can simultaneously complete a discharge operation, to clear electric charges originally stored in the plurality of rows of photosensitive units. During exposure, the rolling shutter image sensor 30 performs global reset, so that the plurality of rows of photosensitive units of the rolling shutter image sensor 30 simultaneously restart exposure.

Figure 6:
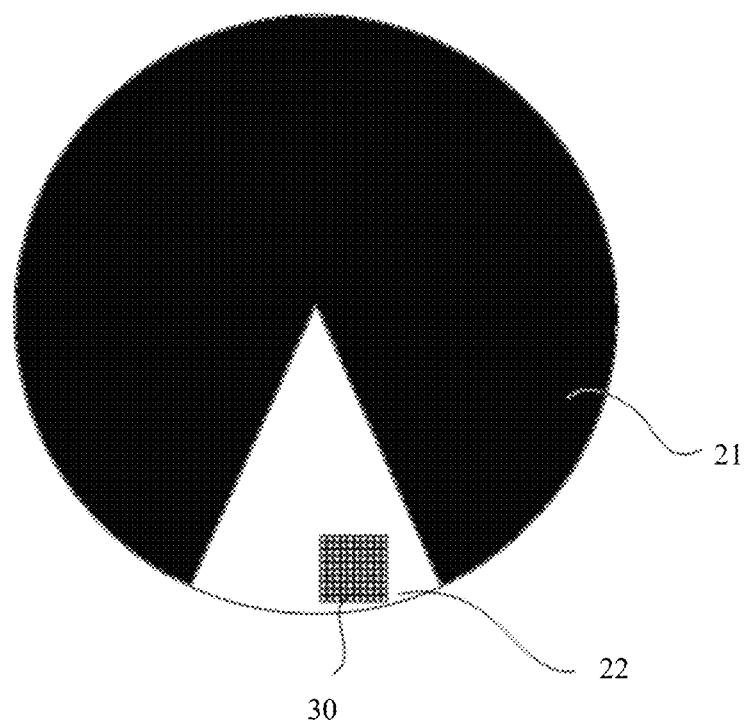
FIG. 6 is a schematic diagram of a structure of a specific wheel according to an embodiment of this application.

FIG. 6 is a schematic diagram of a structure of a specific wheel according to an embodiment of this application. A light shielding part 21 and a light transmission part 22 are disposed on the wheel 20, and the driving apparatus may drive the wheel 20 to rotate relative to the rolling shutter image sensor 30. For example, the wheel 20 rotates clockwise or counterclockwise relative to the rolling shutter image sensor 30. The light shielding part 21 is configured to block light, and the light transmission part 22 is configured to transmit light. During exposure of the plurality of rows of photosensitive units, the plurality of rows of photosensitive units of the rolling shutter image sensor 30 are exposed to the light transmission part 22, and light can be transmitted to the plurality of rows of photosensitive units through the light transmission part 22. The plurality of rows of photosensitive units are configured to: receive light transmitted by the light transmission part 22, and convert a light signal into an electrical signal through optical-to-electrical conversion. As the wheel 20 rotates, the light shielding part 21 (a partial structure other than the light transmission part 22) of the wheel 20 performs progressive blocking on the photosensitive units in an arrangement direction of the plurality of rows of photosensitive units, and light shielding is performed in a very short time.

In addition, as shown in FIG. 5, to facilitate understanding of the image capturing apparatus provided in this embodiment of this application, a first-row photosensitive unit 301 and a second-row photosensitive unit 302 that are adjacent in the plurality of rows of photosensitive units are defined. A difference between duration in which the first-row photosensitive unit 301 receives light and duration in which the second-row photosensitive unit 302 receives light is less than a signal read time of the first-row photosensitive unit 301. In other words, a difference between exposure duration of the first-row photosensitive unit 301 and exposure duration of the second-row photosensitive unit 302 is less than a signal read time of one-row photosensitive unit.

The rolling shutter image sensor 30 performs global reset, so that exposure start moments of the plurality of rows of photosensitive units in the rolling shutter image sensor 30 are the same. Therefore, a difference between exposure times of two adjacent rows of photosensitive units in the plurality of rows of photosensitive units is a time difference in which the two rows of photosensitive units are blocked by the wheel 20. A speed at which the wheel 20 blocks the plurality of rows of photosensitive units is controlled, so that a difference between exposure times of two adjacent rows of photosensitive units in the plurality of rows of photosensitive units is less than a signal read time of each row photosensitive unit, to ensure that exposure times of the plurality of rows of photosensitive units are as close as possible.

In an embodiment, the wheel 20 provided in this embodiment of this application is a circular wheel, and the light transmission part 22 is a notch of the wheel 20. For example, the light transmission part 22 is a notch in a shape of a fan. It should be understood that the circular wheel 20 shown in FIG. 3 is merely a specific example. Alternatively, the wheel 20 provided in this embodiment of this application may be a wheel of different shapes, for example, an elliptic shape, a square shape, and a special shape. In addition, a shape of the light transmission part 22 is not specifically limited in this embodiment of this application. Other than a fan shape, different shapes such as a rectangle or an ellipse may be used, provided that the light transmission part 22 can completely block the rolling shutter image sensor 30 for a period of time when the wheel 20 rotates, that is, the rolling shutter image sensor 30 can perform exposure through the light transmission part 22.

The wheel 20 may be a black wheel, to obtain better light shielding effect. When a black wheel is used, the wheel 20 may be made of a black material, for example, black plastic, resin, or the like. It is clear that the wheel 20 may alternatively be made of another material. For example, the wheel 20 is made of transparent glass, and an opaque black coating may be attached to the wheel 20, to achieve light shielding effect. Other than the foregoing materials, another opaque material, for example, steel, iron, aluminum, or another metal material, can also achieve same effect.

In an embodiment, a band-pass optical filter (which is not shown in the figure, and for a shape of the filter, refer to a shape of the light transmission part 22) is disposed on the light transmission part 22 of the wheel 20. The band-pass optical filter is configured to filter out stray light (for example, light other than visible light), to improve exposure effect of the photosensitive unit during exposure. For example, the band-pass optical filter may use an infrared filter, to improve effect of exposure.

In an embodiment, the rolling shutter image sensor 30 is close to an edge of the circular wheel 20 (for example, rolling shutter image sensor 30 is away from the center of the circular wheel 20). Therefore, when the wheel 20 blocks the photosensitive units, the wheel 20 has a large linear velocity, so that exposure time differences between the plurality of rows of photosensitive units are as equal as possible. Specifically, one or more vertices of the rolling shutter image sensor 30 may be connected to the arc of the circular wheel 20, so that the rolling shutter image sensor 30 is as close as possible to the edge of the circular wheel 20, and the rolling shutter image sensor 30 is still located in the light transmission part 22. For example, in FIG. 6, one vertex of the rolling shutter image sensor 30 of a square shape is connected to the arc of the circular wheel 20, and the rolling shutter image sensor 30 is still located in the light transmission part 22.

The driving apparatus configured to drive the wheel 20 to rotate may include a driving motor, and a rotating shaft of the driving motor is directly fastened to the wheel 20. Alternatively, the driving apparatus includes a driving motor and a reduction gear assembly, and a rotating shaft of the driving motor is connected to the wheel by using the reduction gear assembly, to drive the wheel 20 to rotate. It should be understood that a manner in which the rotating shaft of the driving motor is directly connected to the wheel 20 or is connected to the wheel 20 by using the reduction gear assembly is a conventional driving connection manner. Details are not described herein again.

In an embodiment, a rotational speed of the driving motor may be set in advance based on a frame rate of the rolling shutter image sensor 30, and the rotational speed of the driving motor is constant. Therefore, after being powered on, the driving motor can drive the wheel 20 to rotate at a constant speed based on the set rotational speed, that is, the wheel 20 rotates at an unchanged angular velocity. Specifically, a time required by the driving motor to drive the wheel 20 to rotate by one circle may be equal to a time required by the rolling shutter image sensor 30 to capture one frame of image. In other words, a quantity of rotation circles of the wheel 20 driven by the driving motor may be equal to the frame rate of the rolling shutter image sensor 30. For example, when the frame rate of the rolling shutter image sensor 30 is 50 Hz, the rolling shutter image sensor 30 captures 50 frames of images per second. Therefore, the quantity of rotation circles that the driving motor drives the wheel 20 in one second is 50. Based on a requirement that the driving motor needs to drive the wheel 20 to rotate 50 circles in one second, the rotational speed of the driving motor can be set.

For ease of understanding, an operating principle of the image capturing apparatus is described below based on a rotation process of the wheel 20.

Figure 7:
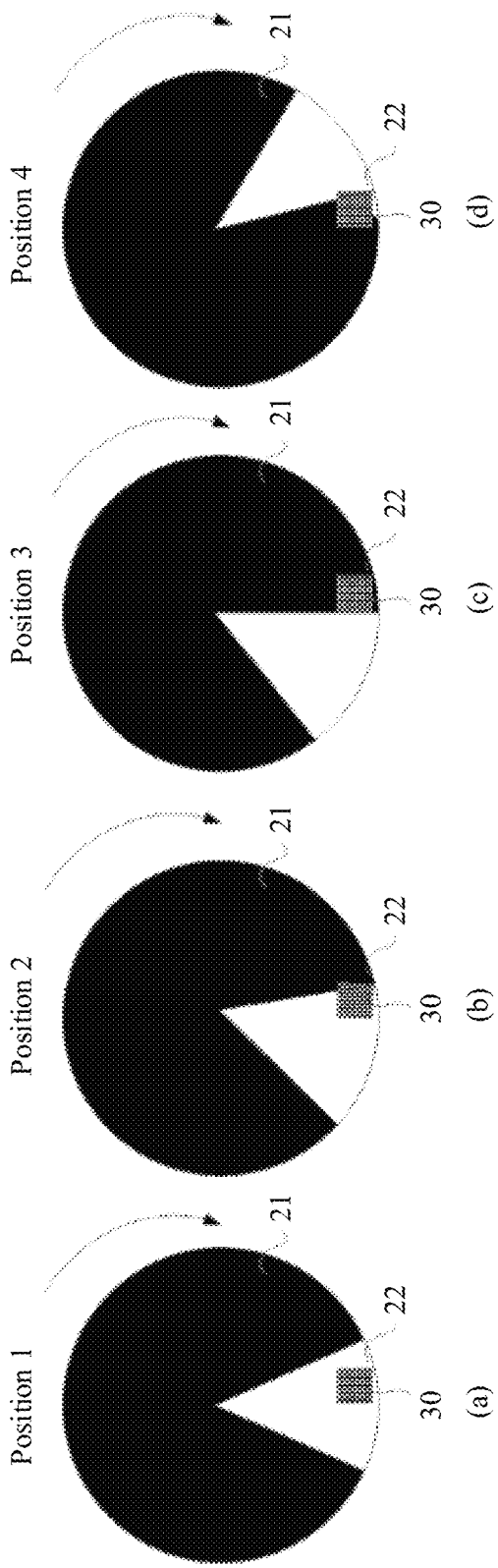
FIG. 7 is a schematic diagram of a relative position between a rolling shutter image sensor 30 and a wheel 20 according to an embodiment of this application.

It should be understood that, when the wheel 20 rotates, there are four relative positions between the rolling shutter image sensor 30 and the wheel 20. FIG. 7 is a schematic diagram of a relative position between the rolling shutter image sensor 30 and the wheel 20 according to an embodiment of this application.

As shown in FIG. 7(a), when the wheel 20 rotates to a position 1, the plurality of rows of photosensitive units of the rolling shutter image sensor 30 are all located in the light transmission part 22. In other words, the plurality of rows of photosensitive units are not blocked by the wheel 20, and the plurality of rows of photosensitive units are in an exposure status.

As shown in FIG. 7(b), when the wheel 20 continues to rotate clockwise from the position 1 to a position 2, some photosensitive units in the plurality of rows of photosensitive units are blocked by the wheel 20, and the other photosensitive units in the plurality of rows of photosensitive units are still located in the light transmission part 22, that is, only some photosensitive units in the plurality of rows of photosensitive units are blocked by the light shielding part 21. In other words, exposure of some photosensitive units in the plurality of rows of photosensitive units ends, and the other photosensitive units in the plurality of rows of photosensitive units are still in the exposure status.

As shown in FIG. 7(c), when the wheel 20 continues to rotate clockwise from the position 2 to a position 3, the plurality of rows of photosensitive units are all blocked by the wheel 20, no light is irradiated to the plurality of rows of photosensitive units, and exposure of the plurality of rows of photosensitive units ends.

As shown in FIG. 7(d), when the wheel 20 continues to rotate clockwise from the position 3 to a position 4, some photosensitive units in the plurality of rows of photosensitive units are located in the light transmission part 22, and the other photosensitive units in the plurality of rows of photosensitive units are still blocked by the light shielding part 21, that is, only some photosensitive units in the plurality of rows of photosensitive units are located in the light transmission part 22. In other words, some photosensitive units in the plurality of rows of photosensitive units start exposure, and the other photosensitive units in the plurality of rows of photosensitive units still do not start exposure.

When the image capturing apparatus works, and the wheel 20 rotates from the position 4 to the position 1, the rolling shutter image sensor 30 triggers global reset, that is, the plurality of rows of photosensitive units of the rolling shutter image sensor 30 simultaneously restart exposure.

Figure 8:
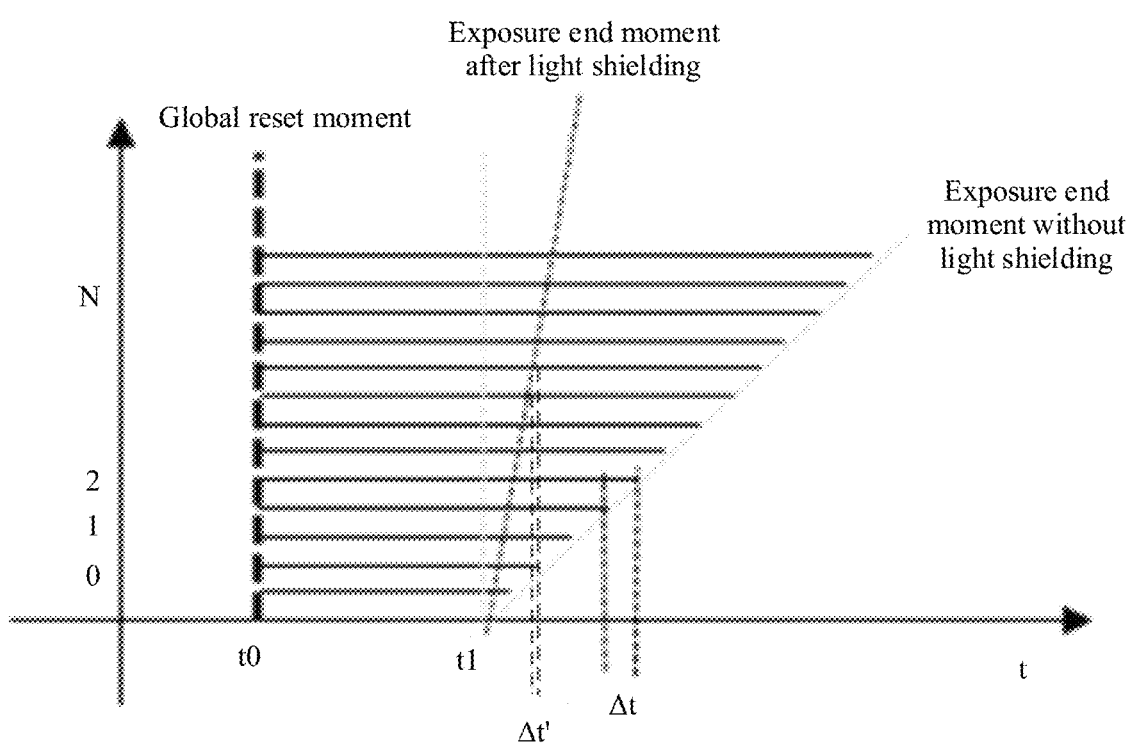
FIG. 8 is a schematic diagram of comparison between exposure times according to an embodiment of this application.

When the wheel 20 rotates from the position 1 to the position 2, the plurality of rows of photosensitive units of the rolling shutter image sensor 30 are gradually blocked by the wheel 20, and the plurality of rows of photosensitive units gradually end exposure. One-row photosensitive unit that is first blocked by the wheel 20 has a shortest exposure time, and one-row photosensitive unit that is latest blocked by the wheel 20 has a longest exposure time. FIG. 8 is a schematic diagram of comparison between exposure times according to an embodiment of this application. As shown in FIG. 8, it is assumed that the rolling shutter image sensor 30 has a total of N+1 rows of photosensitive units: a $0^{th}$-row of photosensitive unit, a first-row photosensitive unit, a second-row photosensitive unit, . . . , and an $N^{th}$-row photosensitive unit. The $0^{th}$-row photosensitive unit has a shortest exposure time, and the $N^{th}$-row photosensitive unit has a longest exposure time. At a moment t0, the $0^{th}$-row photosensitive unit to the $N^{th}$-row photosensitive unit are all located in the light transmission part 22, and the rolling shutter image sensor 30 triggers global reset. In other words, the moment t0 is a global reset moment, and the $0^{th}$-row photosensitive unit to the $N^{th}$-row photosensitive unit simultaneously restart exposure at the moment to. At a moment t1, the wheel 20 gradually blocks the plurality of rows of photosensitive units of the rolling shutter image sensor 30 from the direction of the $0^{th}$-row photosensitive unit to the $N^{th}$-row photosensitive unit until all photosensitive units are blocked. In FIG. 8, a slash starting from the moment t1 is an exposure end moment corresponding to each row photosensitive unit after light is blocked based on the wheel 20. Therefore, after light is blocked, a difference between exposure times of two adjacent rows of photosensitive units is actually a time required by the wheel 20 to rotate by one-row photosensitive unit.

Further, from the moment t1, signals of the plurality of rows of photosensitive units of the rolling shutter image sensor 30 are read row by row from the $0^{th}$-row photosensitive unit until the $N^{th}$-row photosensitive unit is read. A time required for reading a signal of one-row photosensitive unit is Δt. When light is not blocked, a next-row photosensitive unit is read after one-row photosensitive unit is read. Therefore, the difference between the exposure times of two adjacent rows of photosensitive units is actually Δt, and an exposure time between the $0^{th}$-row photosensitive unit and the $N^{th}$-row photosensitive unit is N*Δt. Usually, it takes more than 10 microseconds to read information about one-row photosensitive unit, and the rolling shutter image sensor 30 usually includes 1000 to 2000 rows of photosensitive units. Therefore, it takes at least 10 to 20 milliseconds to read all the photosensitive units of the rolling shutter image sensor 30, that is, a difference between exposure times of the photosensitive units can be up to 10 to 20 milliseconds. In a scenario in which a vehicle moves at a high speed, in 10 to 20 milliseconds, the vehicle may have generated a specific shift, and an image captured by the image capturing apparatus is deformed.

Figure 9:
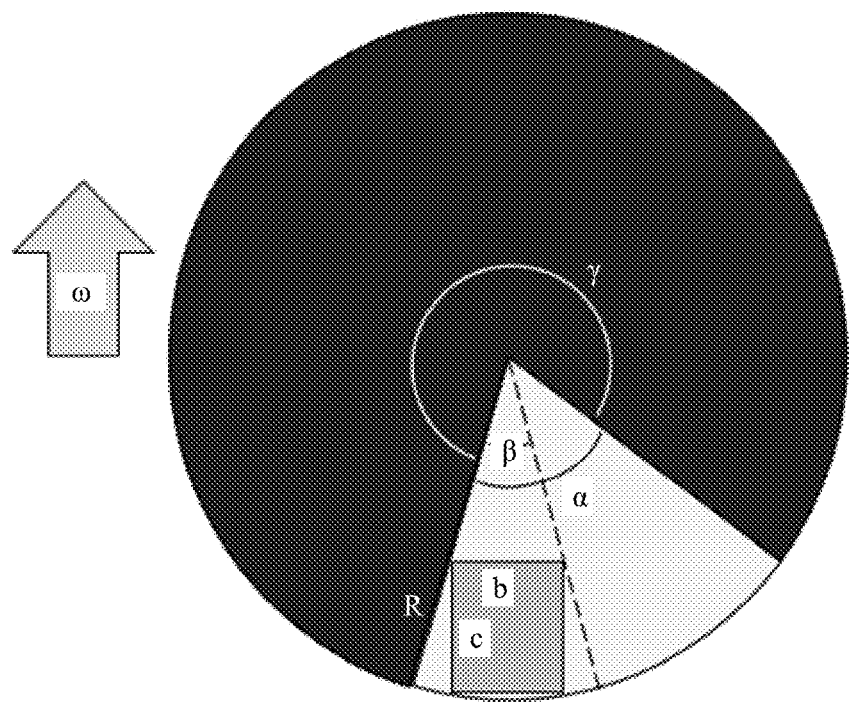
FIG. 9 is a schematic diagram of an angle of a wheel according to an embodiment of this application.

For the rolling shutter image sensor 30 provided in this embodiment of this application, a difference between exposure times of two adjacent rows of photosensitive units is actually a time required by the wheel 20 to rotate by one-row photosensitive unit. For details, refer to FIG. 9. FIG. 9 is a schematic diagram of an angle of the wheel according to an embodiment of this application. As shown in FIG. 9, it is assumed that an angle occupied by the rolling shutter image sensor 30 is β, that is, the wheel 20 needs to rotate by the angle, to rotate from a position that just does not block the rolling shutter image sensor 30 to a position that just completely blocks the rolling shutter image sensor 30. A rotational speed of the wheel 20 is ω, a radius of the wheel 20 is R, a long edge of the rolling shutter image sensor 30 is c, and a short edge of the rolling shutter image sensor 30 is b. In addition, the frame rate of the rolling shutter image sensor 30 is fps, and fps indicates a quantity of images captured by the rolling shutter image sensor 30 in one second.

Based on information about the wheel 20 and the rolling shutter image sensor 30, a time required by the wheel 20 to completely block the plurality of rows of photosensitive units of the rolling shutter image sensor 30 can be obtained according to the following formula 1.

$$\left.\begin{array}{c}\dfrac{b}{2\sin\dfrac{\beta}{2}} + c = R \\ t = \dfrac{\beta}{\omega} \\ \omega = fps * \pi\end{array}\right\} t = \dfrac{2\arcsin\left(\dfrac{b}{2(R-c)}\right)}{fps * \pi}$$ Formula 1 t indicates a transition status time, and the transition status time is a time required by the wheel 20 from blocking the first-row photosensitive unit to completely blocking the plurality of rows of photosensitive units.

The transition status time t obtained according to the formula 1 is usually about 100 to 300 microseconds, and a maximum difference between exposure times of the photosensitive units is also in the range of 100 to 300 microseconds, and is far less than the 10 to 20 milliseconds required for reading all the photosensitive units of the rolling shutter image sensor 30 described above. Simply, in the related technology, a difference between exposure times of photosensitive units of the rolling shutter image sensor is equal to a time required for reading signals of the photosensitive units, that is, the difference between exposure times of photosensitive units of the rolling shutter image sensor can be up to 10 to 20 milliseconds. However, in this embodiment, a maximum difference between exposure times of the photosensitive units is in a range of 100 to 300 microseconds, and is far less than 10 to 20 milliseconds. Therefore, in this embodiment, the wheel is set, to significantly reduce a difference between exposure times of photosensitive units. This can achieve good image capturing effect at low costs, and meet an image capturing requirement in a high-speed moving scenario.

When the rolling shutter image sensor 30 is completely blocked by the light shielding part 21, the photosensitive units may continuously be read until signals of all the photosensitive units of the rolling shutter image sensor 30 are read. It should be noted that when the wheel 20 is designed, the rolling shutter image sensor 30 is completely blocked by the light shielding part 21 before the signals of all the photosensitive units of the rolling shutter image sensor 30 are read.

Figure 10:
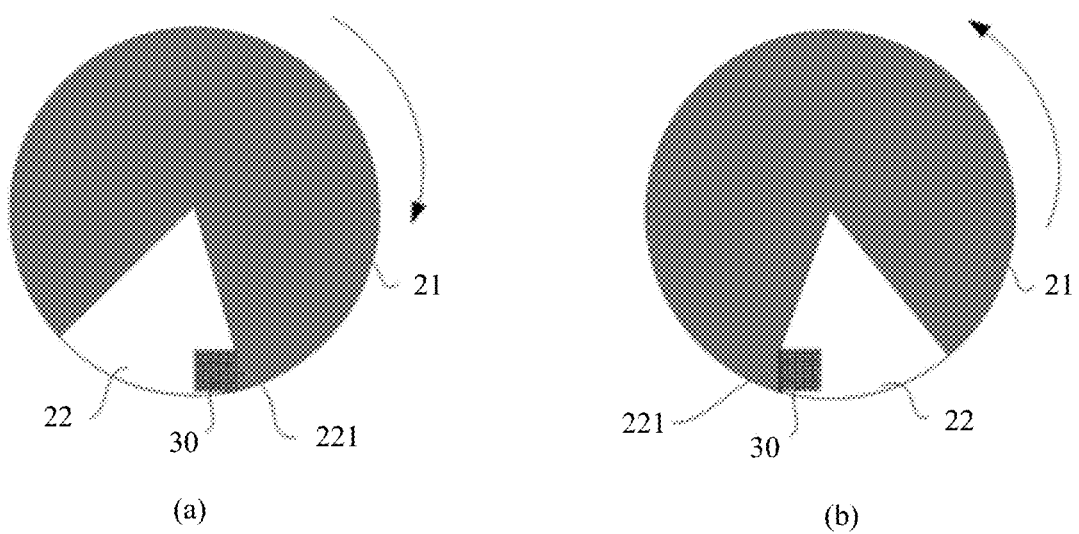
FIG. 10 is a schematic diagram of a structure of a wheel according to an embodiment of this application.

In an embodiment, to minimize the transition status time, a first side of the light transmission part 22 includes a first edge 221 in a direction from a circle center to an arc edge, and the first edge 221 is parallel to a target-row photosensitive unit when blocking the target-row photosensitive unit. The target-row photosensitive unit is any row photosensitive unit in the plurality of rows of photosensitive units. For example, the target-row photosensitive unit may be one-row photosensitive unit with a shortest exposure time in the plurality of rows of photosensitive units. FIG. 10 is a schematic diagram of a structure of the wheel according to an embodiment of this application. As shown in FIG. 10(a), when the wheel 20 rotates clockwise, the right side of the light transmission part 22 includes two edges in a direction from a circle center to an arc edge. One of the two edges closer to the rolling shutter image sensor 30 is parallel to a rightmost row photosensitive unit when blocking the rightmost row photosensitive unit, to save a time for the wheel 20 to completely block the photosensitive units of the rolling shutter image sensor 30, that is, the transition status time is reduced. As shown in FIG. 10(b), when the wheel 20 rotates counterclockwise, the left side of the light transmission part 22 includes two edges, and the first edge 221 in the two edges is parallel to a leftmost row photosensitive unit when blocking the leftmost row photosensitive unit. It may be understood that the foregoing example is described by using an example in which one side of the light transmission part 22 includes two edges. During actual application, one side of the light transmission part 22 may also include another edge other than the first edge 221, provided that the first edge 221 on one side of the light transmission part 22 is parallel to the target-row photosensitive unit when blocking the target-row photosensitive unit. Details are not described herein again.

In an embodiment, to help determine a moment at which the rolling shutter image sensor 30 triggers global reset, a sensor and a controller may further be disposed in the image capturing apparatus. The sensor is configured to detect a relative position between the wheel 20 and the plurality of rows of photosensitive units. When the sensor detects that the plurality of rows of photosensitive units of the rolling shutter image sensor 30 all receive light transmitted by the light transmission part 21, the sensor sends a trigger signal, so that the controller controls the plurality of rows of photosensitive units of the rolling shutter image sensor 30 to perform global reset. For example, a marker may be disposed on the wheel 20, the sensor is a photoelectric sensor, and the sensor may determine a position of the wheel 20 based on the marker. Specifically, a position of the marker corresponds to a first position of the wheel, that is, when the sensor detects that the wheel is in the first position, the controller is triggered to control the plurality of rows of photosensitive units of the rolling shutter image sensor 30 to perform global reset. For example, the sensor may alternatively be an absolute angle sensor. It is determined, by detecting an angle at which the wheel 20 is located, that the wheel 20 is in the first position, to trigger the controller to control the plurality of rows of photosensitive units of the rolling shutter image sensor 30 to perform global reset.

Figure 11:
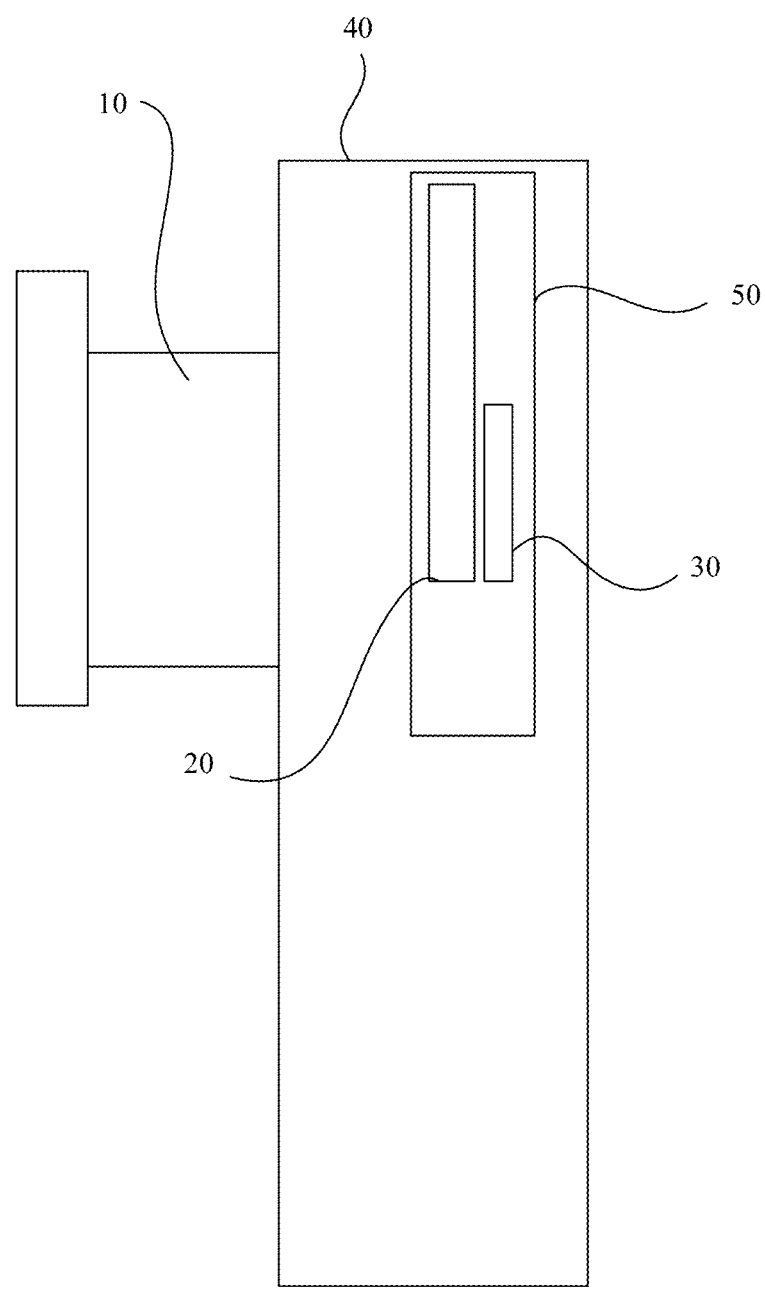
FIG. 11 is a schematic diagram of a structure of an image capturing apparatus according to an embodiment of this application.

FIG. 11 is a schematic diagram of a structure of an image capturing apparatus according to an embodiment of this application. As shown in FIG. 11, the image capturing apparatus further includes a base 40. The base 40 is used as a bearer structure, to bear a functional component of the image capturing apparatus, for example, bear components such as the lens 10, the wheel, and the rolling shutter image sensor 30.

During assembly, the lens 10 is fastened to the base 40 through a standard interface, and the wheel is fastened to the base 40 and separated from the lens 10. In addition, when the wheel 20 is assembled, the wheel 20 is offset to one side of an optical axis to avoid the optical axis of the lens 10. However, when the wheel 20 is disposed, it is ensured that the band-pass optical filter of the wheel 20 can block an entire imaging optical path during rotation (that is, the entire rolling shutter image sensor 30 is blocked).

In an embodiment, the image capturing apparatus further includes a housing 50. The housing 50 protects the entire wheel 20 and the rolling shutter image sensor 30 from light leakage and dust.

Because the wheel gradually blocks the plurality of rows of photosensitive units of the rolling shutter image sensor, exposure times of the plurality of rows of photosensitive units of the rolling shutter image sensor are not the same. As shown in FIG. 8, because the wheel performs progressive blocking on the plurality of rows of photosensitive units of the rolling shutter image sensor, after blocking one-row photosensitive unit in the plurality of rows of photosensitive units, the wheel continues to block a next-row photosensitive unit. Therefore, a difference between exposure times of any two adjacent rows of photosensitive units is $\Delta t'$, namely, a time required by the wheel to block one-row photosensitive unit. In other words, an exposure time of any row photosensitive unit in the plurality of rows of photosensitive units is $\Delta t'$ greater than an exposure time of a previous-row photosensitive unit of the any row photosensitive unit.

In view of this, an embodiment of this application further provides a brightness balancing method, to perform adaptive brightness balancing on different photosensitive units, so as to avoid a brightness difference caused by inconsistent exposure times.

An embodiment of this application provides a brightness balancing method. The method is applied to an image capturing apparatus. For a specific structure of the image capturing apparatus, refer to embodiments corresponding to FIG. 4 to FIG. 11. Details are not described herein again.

Figure 12:
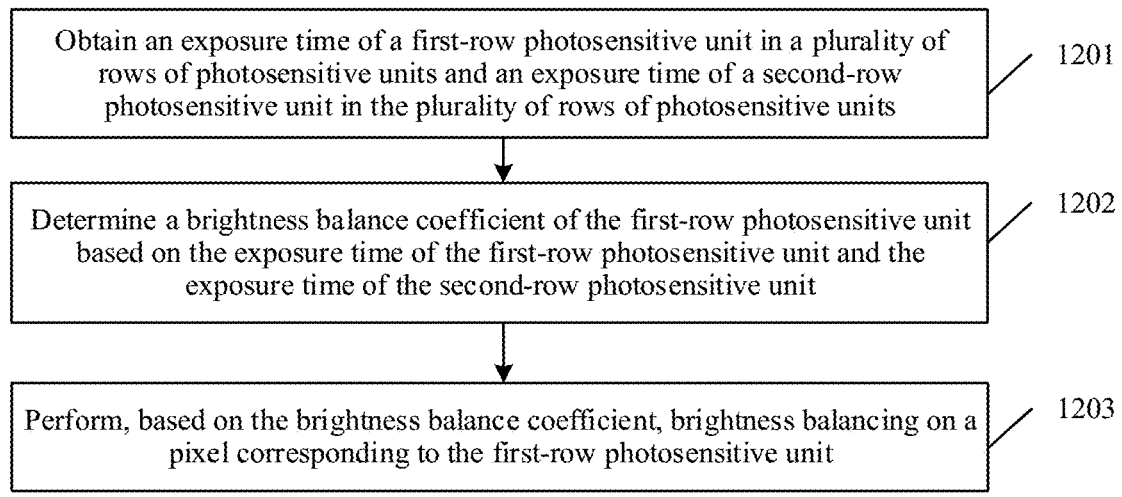
FIG. 12 is a schematic flowchart of a brightness balancing method according to an embodiment of this application.

FIG. 12 is a schematic flowchart of a brightness balancing method according to an embodiment of this application. As shown in FIG. 12, the brightness balancing method includes operation 1201 to operation 1203.

Operation 1201: Obtain an exposure time of a first-row photosensitive unit in a plurality of rows of photosensitive units and an exposure time of a second-row photosensitive unit in the plurality of rows of photosensitive units.

It may be understood that the photosensitive unit can convert an optical signal irradiated to the photosensitive unit into an electrical signal. Therefore, an exposure process of the photosensitive unit is actually a process in which the photosensitive unit continuously converts the optical signal into the electrical signal. After the photosensitive unit converts the optical signal into the electrical signal, a series of processing is performed on the electrical signal converted by the photosensitive unit, to obtain a pixel of an image. A value of the pixel corresponds to the electrical signal converted by the photosensitive unit. Usually, a longer exposure time of the photosensitive unit indicates higher brightness corresponding to a pixel obtained by the photosensitive unit after exposure. Therefore, during brightness balancing, brightness of a pixel corresponding to a photosensitive unit with a long exposure time may be decreased, or brightness of a pixel corresponding to a photosensitive unit with a short exposure time may be increased, to implement brightness balancing of the plurality of rows of photosensitive units.

In this embodiment, before brightness balancing is performed, the exposure time of the first-row photosensitive unit and the exposure time of the second-row photosensitive unit may be obtained first. The first-row photosensitive unit is one-row photosensitive unit on which brightness balancing needs to be performed, and the first-row photosensitive unit may be any row photosensitive unit in the plurality of rows of photosensitive units other than the second-row photosensitive unit. The second-row photosensitive unit is one-row photosensitive unit used as a brightness reference, and brightness of a pixel corresponding to the second-row photosensitive unit does not need to be adjusted.

Specifically, during actual application, the exposure time of the first-row photosensitive unit may be obtained based on an exposure time of a third-row photosensitive unit, a transition status time, a row in which the first-row photosensitive unit is located, and a quantity of rows of the plurality of rows of photosensitive units. The exposure time of the second-row photosensitive unit may be obtained based on the exposure time of the third-row photosensitive unit, the transition status time, a row in which the second-row photosensitive unit is located, and the quantity of rows of the plurality of rows of photosensitive units. The third-row photosensitive unit is one-row photosensitive unit with a shortest exposure time in the plurality of rows of photosensitive units. The transition status time is a time required from ending of exposure of one-row photosensitive unit with a shortest exposure time in the plurality of rows of photosensitive units to ending of exposure of one-row photosensitive unit with a longest exposure time in the plurality of rows of photosensitive units.

Figure 13:
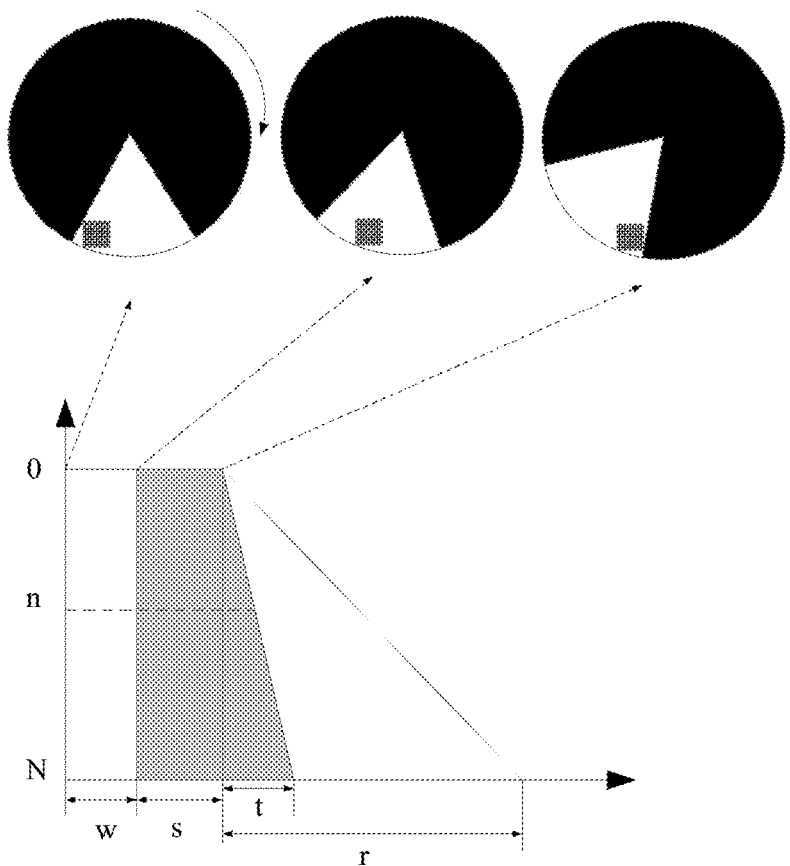
FIG. 13 is a schematic diagram of a brightness balance coefficient according to an embodiment of this application.

FIG. 13 is a schematic diagram of a brightness balance coefficient according to an embodiment of this application. As shown in FIG. 13, one period of rotation of a wheel includes four time periods: a waiting time w, an exposure time s, a transition status time t, and a read time r. The waiting time w is a time period from a moment when the rolling shutter image sensor just completely enters a notch to a moment when the rolling shutter image sensor triggers global reset. The exposure time s is the exposure time of the third-row photosensitive unit. The transition status time t is a time period from a moment when the wheel starts blocking the third-row photosensitive unit to a moment when the plurality of rows of photosensitive units are completely blocked. The read time r is a time required for reading signals of all the photosensitive units of the rolling shutter image sensor. During actual application, because the transition status time t and the read time r are fixed, the waiting time w may be determined based on the exposure time s and a time required by the wheel to rotate for one period. For example, when the time required by the wheel to rotate for one period is equal to a sum of the exposure time s, the transition status time t, and the read time r, the waiting time w is 0.

It may be understood that the exposure time of the third-row photosensitive unit is a shortest exposure time in exposure times of the plurality of rows of photosensitive units. Therefore, for any row photosensitive unit in the plurality of rows of photosensitive units, an exposure time is actually the exposure time of the third-row photosensitive unit plus a time required by the wheel to start blocking from the third-row photosensitive unit to the any row photosensitive unit. In addition, because the wheel rotates at a constant speed, the time required by the wheel to start blocking from the third-row photosensitive unit to the any row photosensitive unit may be obtained based on the transition status time, a row in which the any row photosensitive unit is located, and the total quantity of rows of the plurality of rows of photosensitive units. The transition status time is determined based on a side length of the image sensor, a frame rate of the image sensor, and a radius of the wheel. For a specific calculation process of the transition status time, refer to the formula 1. Details are not described herein again.

For example, it is assumed that there are N+1 rows of photosensitive units: a $0^{th}$-row photosensitive unit, a first-row photosensitive unit, a second-row photosensitive unit, . . . , and an $N^{th}$-row photosensitive unit. The $0^{th}$-row photosensitive unit has a shortest exposure time s, and the $N^{th}$-row photosensitive unit has a longest exposure time s+t, where t is the transition status time. For an $n^{th}$-row photosensitive unit, an exposure time of the $n^{th}$-row photosensitive units is s+n*t/N.

Operation 1202: A brightness balance coefficient of the first-row photosensitive unit is determined based on the exposure time of the first-row photosensitive unit and the exposure time of the second-row photosensitive unit.

In this embodiment, because a relationship between the exposure time and the brightness of the pixel corresponding to the first-row photosensitive unit is a linear relationship, the brightness balance coefficient of the first-row photosensitive unit may be calculated based on the exposure time between the two rows. Specifically, the exposure time of the second-row photosensitive unit may be divided by the exposure time of the first-row photosensitive unit, to obtain the brightness balance coefficient of the first-row photosensitive unit.

For example, it is assumed that the exposure time of the second-row photosensitive unit is t0, the exposure time of the first-row photosensitive unit is t1, the brightness balance coefficient is gain(n), and the brightness balance coefficient of the first-row photosensitive unit may be obtained according to the following formula 2:

$$gain(n)=t0/t1 \quad \text{Formula 2}$$

Optionally, for ease of calculation, the second-row photosensitive unit may be set to the $0^{th}$-row photosensitive unit or the $N^{th}$-row photosensitive unit. The $0^{th}$-row photosensitive unit is one-row photosensitive unit with a shortest exposure time in the plurality of rows of photosensitive units, and the $N^{th}$-row photosensitive unit is one-row photosensitive unit with a longest exposure time in the plurality of rows of photosensitive units.

For example, it is assumed that the second-row photosensitive unit is the $0^{th}$-row photosensitive unit, the first-row photosensitive unit is the $n^{th}$-row photosensitive unit, and the brightness balance coefficient of the first-row photosensitive unit may be obtained according to the following formula 3:

$$gain(n)=s/(s+n*t/N) \quad \text{Formula 3}$$

It may be understood that, when the second-row photosensitive unit is the $0^{th}$-row photosensitive unit, the exposure time of the first-row photosensitive unit serving as the $n^{th}$-row photosensitive unit is greater than the exposure time of the second-row photosensitive unit. Therefore, the brightness balance coefficient gain(n) obtained according to the formula 3 is less than 1. The brightness of the first-row photosensitive unit is multiplied by the brightness balance coefficient less than 1, to reduce the brightness of the first-row photosensitive unit. This can implement brightness balance between the second-row photosensitive unit and the first-row photosensitive unit.

For example, it is assumed that the second-row photosensitive unit is the $N^{th}$-row photosensitive unit, the first-row photosensitive unit is the $n^{th}$-row photosensitive unit, and the brightness balance coefficient of the first-row photosensitive unit may be obtained according to the following formula 4:

$$gain(n)=(s+t)/(s+n*t/N) \quad \text{Formula 4}$$

Similarly, when the second-row photosensitive unit is the $N^{th}$-row photosensitive unit, the exposure time of the first-row photosensitive unit serving as the $n^{th}$-row photosensitive unit is less than the exposure time of the second-row photosensitive unit. Therefore, the brightness balance coefficient gain(n) obtained according to the formula 4 is greater than 1. The brightness of the first-row photosensitive unit is multiplied by the brightness balance coefficient greater than 1, to improve the brightness of the first-row photosensitive unit. This can implement brightness balance between the second-row photosensitive unit and the first-row photosensitive unit.

Operation 1203: Perform, based on the brightness balance coefficient, brightness balancing on the pixel corresponding to the first-row photosensitive unit.

After the image captured by the image capturing apparatus is obtained, the pixel corresponding to the first-row photosensitive unit may be determined in the image, and brightness of the pixel is compensated based on the brightness balance coefficient. The brightness of the pixel after compensation is a product of the brightness of the pixel before compensation and the brightness balance coefficient.

Specifically, in a process of performing brightness balancing on the image, it is assumed that L(n) is brightness of an $n^{th}$ row of the image output by the rolling shutter image sensor. L(n) is a vector, and a value of each element in L(n) is a value of each pixel in the $n^{th}$ row of the image. L'(n) is brightness of the $n^{th}$ row of the image after brightness balancing is performed, a dark level is BL, and L'(n)=gain (n)*(L(n)−BL). The dark level is a brightness value of a pixel output by the rolling shutter image sensor without light. Usually, a value corresponding to the dark level is subtracted from a pixel value in the image.

Figure 14:
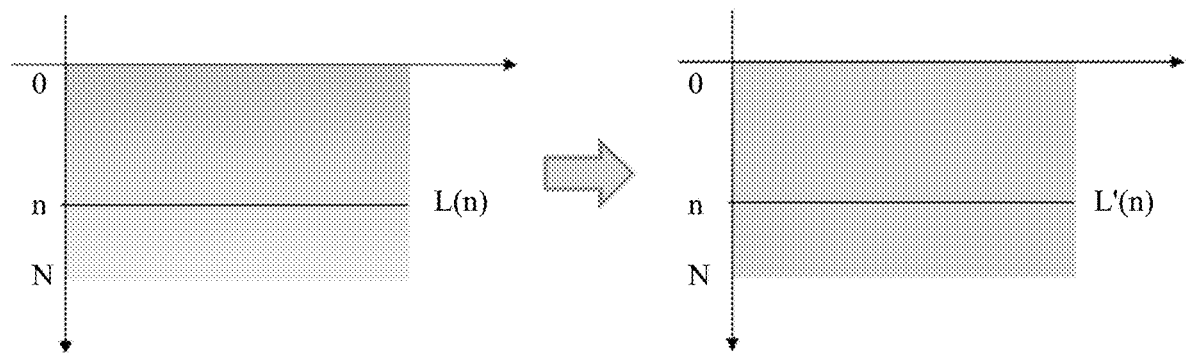
FIG. 14 is a schematic diagram of comparison between an image before brightness balancing and an image after brightness balancing according to an embodiment of this application.

For example, FIG. 14 is a schematic diagram of comparison between an image before brightness balancing and an image after brightness balancing according to an embodiment of this application. It can be learned from FIG. 14 that after brightness balancing is performed on an image, brightness values of pixels corresponding to rows of photosensitive units in the image are the same.

In this embodiment, brightness of each row photosensitive unit is adjusted by using a row-based brightness balancing method, to effectively compensate a local brightness difference in an image due to different exposure times of different rows. This can ensure image quality.

Figure 15:
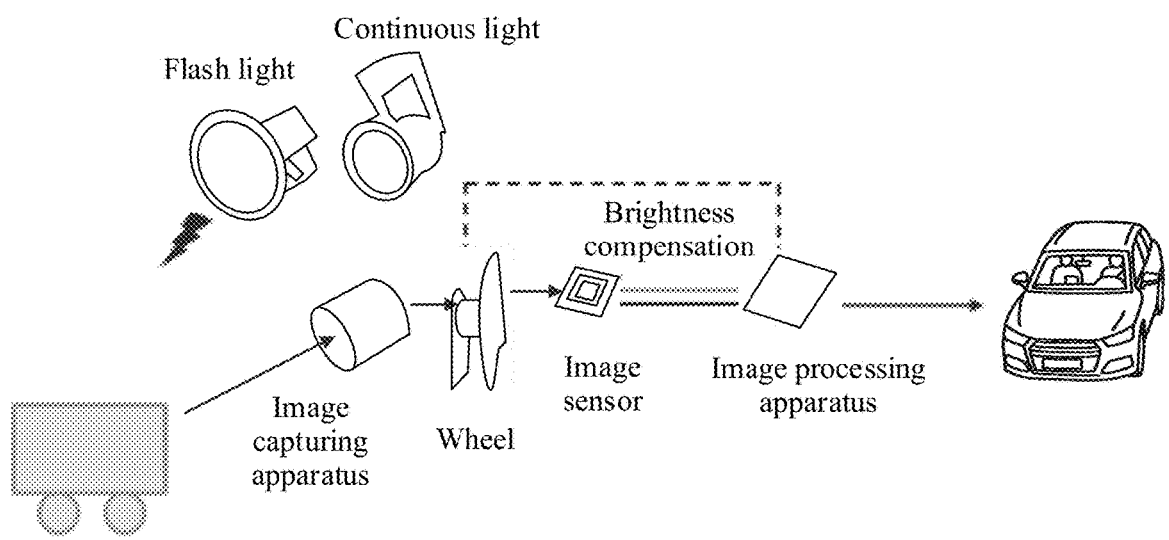
FIG. 15 is a schematic diagram of an application scenario according to an embodiment of this application.

FIG. 15 is a schematic diagram of an application scenario according to an embodiment of this application. As shown in FIG. 15, the image capturing apparatus provided in embodiments of this application is configured to snap a vehicle, and the brightness balancing method provided in embodiments of this application is used to perform brightness balancing on an image captured by the image capturing apparatus. Specifically, the image capturing apparatus, flash light and continuous light are installed on the crossbar above the road. When it is detected that a vehicle passes a snapping line, the flash light is controlled to flash, and the wheel and the image sensor in the image capturing apparatus cooperate to complete exposure, to obtain a primary image. Then, brightness balancing is performed, according to the brightness balancing method, on the image captured by the image sensor, and an image processing apparatus performs a series of processing on the image obtained through brightness balancing according to an image processing algorithm, and outputs a snapped image.

Figure 16:
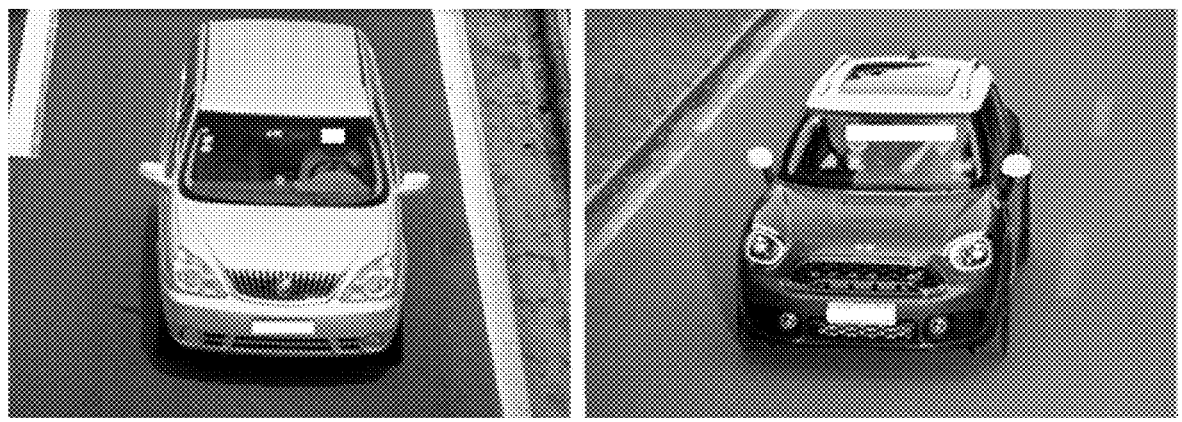
FIG. 16 is a schematic diagram of an image photographed by an image capturing apparatus according to an embodiment of this application.

Specifically, FIG. 16 is a schematic diagram of an image photographed by an image capturing apparatus according to an embodiment of this application. As shown in FIG. 16, an image obtained after a vehicle is snapped by using the image capturing apparatus provided in this embodiment of this application is obviously not deformed, and brightness of the image is balanced, to meet a snapping requirement in a traffic scenario.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the apparatus embodiment described above is merely an example. For example, division into units is merely logical function division and may be another division manner in actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in an electronic form, a mechanical form, or another form.

Units described as separate parts may or may not be physically separate, and parts displayed as units may or may not be physical units, may be located in one position, or may be distributed on a plurality of network units. Some or all of the units may be selected based on actual requirements to achieve objectives of the solutions of the embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and is sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) to perform all or some of the operations of the methods described in the embodiments of this application. The foregoing storage medium includes any medium that can store program code, such as a USB flash drive, a removable hard disk, a read-only memory, a random access memory, a magnetic disk, or an optical disc.

What is claimed is:

1. An image capturing apparatus, comprising:
   a rolling shutter image sensor;
   a wheel located on a photosensitive side of the rolling shutter image sensor, wherein a light shielding part and a light transmission part are disposed on the wheel, the light shielding part is configured to block light, and the light transmission part is configured to transmit light;
   a driving apparatus that is connected to the wheel, and is configured to drive the wheel to rotate, wherein
   the rolling shutter image sensor comprises a plurality of rows of photosensitive units, and the plurality of rows of photosensitive units are configured to: receive light transmitted by the light transmission part, and convert a light signal into an electrical signal through optical-to-electrical conversion; and
   an image processing apparatus configured to obtain an exposure time of a first-row photosensitive unit based on an exposure time of a third-row photosensitive unit, a transition status time, a row in which the first-row photosensitive unit is located, and a quantity of rows of the plurality of rows of photosensitive units; and perform brightness balancing on a pixel corresponding to the first-row photosensitive unit.

2. The image capturing apparatus according to claim 1, wherein the light transmission part is a notch on the wheel.

3. The image capturing apparatus according to claim 1, wherein a band-pass optical filter is disposed on the light transmission part.

4. The image capturing apparatus according to claim 1, wherein the wheel is of a circular shape, and the light transmission part is of a fan shape.

5. The image capturing apparatus according to claim 4, wherein one side of the light transmission part comprises a first edge in a direction from a circle center to an arc edge, the first edge is parallel to a target-row photosensitive unit when blocking the target-row photosensitive unit, and the target-row photosensitive unit is one-row photosensitive unit in the plurality of rows of photosensitive units.

6. The image capturing apparatus according to claim 1, wherein the plurality of rows of photosensitive units comprise a first-row photosensitive unit and a second-row photosensitive unit that are adjacent, and a difference between duration in which the first-row photosensitive unit receives light and duration in which the second-row photosensitive unit receives light is less than a signal read time of the first-row photosensitive unit.

7. The image capturing apparatus according to claim 1, wherein the image capturing apparatus further comprises a sensor and a controller, and the sensor is configured to detect a position relationship between the wheel and the plurality of rows of photosensitive units; and the controller is configured to: when the sensor detects that the plurality of rows of photosensitive units all receive light transmitted by the light transmission part, control the plurality of rows of photosensitive units to perform global reset.

8. A brightness balancing method, wherein the method is applied to an image capturing apparatus, the image capturing apparatus comprises a plurality of rows of photosensitive units, and the method comprises:

obtaining an exposure time of a first-row photosensitive unit in the plurality of rows of photosensitive units and an exposure time of a second-row photosensitive unit in the plurality of rows of photosensitive units, wherein the exposure time of the first-row photosensitive unit is obtained based on an exposure time of a third-row photosensitive unit, a transition status time, a row in which the first-row photosensitive unit is located, and a quantity of rows of the plurality of rows of photosensitive units;

determining a brightness balance coefficient of the first-row photosensitive unit based on the exposure time of the first-row photosensitive unit and the exposure time of the second-row photosensitive unit; and performing, based on the brightness balance coefficient, brightness balancing on a pixel corresponding to the first-row photosensitive unit.

9. The method according to claim 8, wherein the obtaining an exposure time of a second-row photosensitive unit comprises:

obtaining the exposure time of the second-row photosensitive unit based on the exposure time of the third-row photosensitive unit, the transition status time, a row in which the second-row photosensitive unit is located, and the quantity of rows of the plurality of rows of photosensitive units, wherein the third-row photosensitive unit is one-row photosensitive unit with a shortest exposure time in the plurality of rows of photosensitive units, and the transition status time is a time required from ending of exposure of one-row photosensitive unit with a shortest exposure time in the plurality of rows of photosensitive units to ending of exposure of one-row photosensitive unit with a longest exposure time in the plurality of rows of photosensitive units.

10. The method according to claim 8, wherein the second-row photosensitive unit is one-row photosensitive unit with a shortest exposure time in the plurality of rows of photosensitive units, or the second-row photosensitive unit is one-row photosensitive unit with a longest exposure time in the plurality of rows of photosensitive units.

11. An image processing apparatus, comprising a memory and a processor, wherein the memory stores instructions, the processor is configured to execute the instructions, and when the instructions are executed, the image processing apparatus performs operations comprising:

obtaining an exposure time of a first-row photosensitive unit in a plurality of rows of photosensitive units and an exposure time of a second-row photosensitive unit in the plurality of rows of photosensitive units, wherein the exposure time of the first-row photosensitive unit is obtained based on an exposure time of a third-row photosensitive unit, a transition status time, a row in which the first-row photosensitive unit is located, and a quantity of rows of the plurality of rows of photosensitive units;

determining a brightness balance coefficient of the first-row photosensitive unit based on the exposure time of the first-row photosensitive unit and the exposure time of the second-row photosensitive unit; and performing, based on the brightness balance coefficient, brightness balancing on a pixel corresponding to the first-row photosensitive unit.

12. A non-transitory computer-readable storage medium, comprising computer-readable instructions, wherein when the computer-readable instructions are run on a computer, the computer is enabled to perform the method according to claim 8.

13. A non-transitory computer program product, comprising computer-readable instructions, wherein when the computer-readable instructions are run on a computer, the computer is enabled to perform the method according to claim 8.

* * * * *